United States Patent [19]

Ohniwa et al.

[11] 4,351,596
[45] Sep. 28, 1982

[54] ELECTROMAGNETIC DRIVING SOURCE FOR SHUTTER

[75] Inventors: Takehiko Ohniwa, Chichibu; Syuichiro Saito, Kawasaki, both of Japan

[73] Assignees: Canon Kabushiki Kaisha, Tokyo; Canon Denshi Kabushiki Kaisha, Saitama, both of Japan

[21] Appl. No.: 216,431

[22] Filed: Dec. 15, 1980

[30] Foreign Application Priority Data

Dec. 19, 1979 [JP] Japan .......................... 54-175841[U]

[51] Int. Cl.³ .............................................. G03B 9/00
[52] U.S. Cl. .................................... 354/234; 335/222; 310/27; 310/36; 310/219
[58] Field of Search .................. 310/12, 13, 27, 36–39, 310/219, 232, 248; 354/239; 324/151 A; 335/222, 272

[56] References Cited

U.S. PATENT DOCUMENTS 3,671,791  6/1972  Müller et al. ...................... 310/219
4,079,400  3/1978  Kondo ................................. 354/234

Primary Examiner—Donovan F. Duggan
Attorney, Agent, or Firm—Toren, McGeady & Stanger

[57] ABSTRACT

A moving coil type electromagnetic driving source designed to obtain reliable contact between slide pieces and current supply brushes for supplying current to the moving coil wherein each slide piece is provided with grooves having two inclined surfaces opposed to each other, with an elastic brush having a circular or semi-circular section being provided for each groove such that the brush is in contact with the groove at two points.

1 Claim, 6 Drawing Figures

ELECTROMAGNETIC DRIVING SOURCE FOR SHUTTER

BACKGROUND OF THE INVENTION

1. Field of the Invention

The present invention relates to electromagnetic driving devices, particularly to a current supply device for an electromagnetic driving mechanism for opening and closing the shutter blades of a camera.

2. Description of the Prior Art

Various types of the electromagnetic driving devices for opening and closing shutter blades are known, with the device having the simplest construction being the meter type electromagnetic driving source is known. Namely, in the magnetic field of the stator consisting of a permanent magnet such that the exciting current is supplied to the coil so as to rotate the coil, thereby making use of the coil torque to drive the shutter blades.

Until now, the current supply to the moving coil of the electromagnetic driving device has been transmitted through the cntact between the current supply brush and the slide surface provided on the rotation shaft. The brush is in contact with the slide surface only at one point, so that due to oxidation of the contact surface contact often becomes inferior, which prevents a reliable current supply such a manner that the operation of the shutter is prevented or making it unstable.

SUMMARY OF THE INVENTION

An object of the present invention is to eliminate the above-mentioned shortcomings, and to provide a current supply device for an electromagnetic driving source for the shutter of the camera, by means of which current is supplied to the moving coil with reliability.

Basically, the present invention may be described as a current supply device for a moving coil type electromagnet driving source so designed that the slide piece rotatable with the rotation axis is provided with a circumferencial groove having two inclined surfaces opposed to each other, while the current supply brush having a circular section is in contact with the two inclined surfaces.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENT

Figure 1:
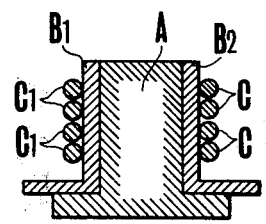
FIG. 1 is a sectional view showing a conventional current supply device.

FIG. 1 shows the current supply part of a conventional moving coil type electromagnetic driving source in which the current supply brushes and the slide pieces are in contact with each other at many points section, wherein A is the rotary axis fixed on a movable coil not shown in the drawing and $B_1$ and $B_2$ are the slide pieces consisting of circular conductive material, being insulated from each other, fixed around the axis A and brought in contact with the one end of the conductor of the moving coil. On the circumference of the slide pieces $B_1$ and $B_2$, multi-wire current supply brushes $C_1$ and C consisting of a plural number of conductive wires are resiliently in contact so as to supply current from power source to the coil through the above-mentioned slide pieces.

In accordance with the above-mentioned construction, the brushes and the slide pieces are normally in contact with each other at a plural number of points, so that the above-mentioned shortcomings are eliminated. However, since the construction of the current supply part is complicated, the manufacturing cost is high and much space is required for installing it in the camera, such a construction is disadvantageous.

In accordance with the present invention in order to obtain a reliable current supply by means of a relatively simple construction one current supply brush provided is in contact with the slide pieces at two points.

Figure 2:
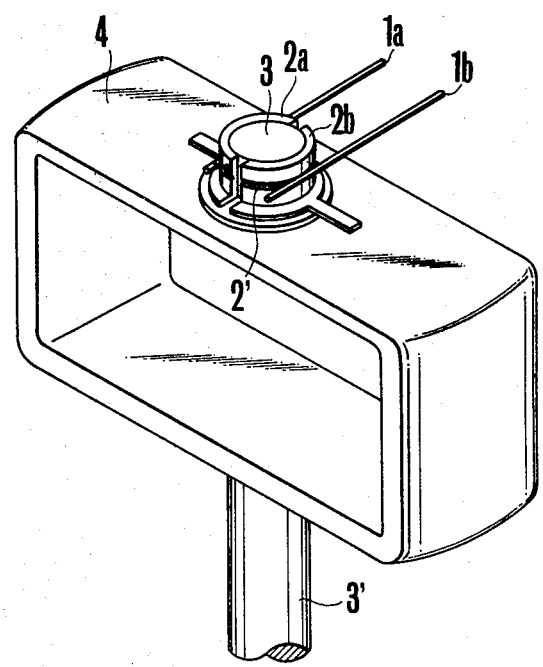
FIG. 2 is a perspective view showing an embodiment of the current supply device in accordance with the present invention.

FIG. 2 shows an embodiment of the current supply device for the electromagnetic driving source in accordance with the present invention in perspective view. In the drawing, 4 is the moving coil arranged in the magnetic field of the stator consisting of a permanent magnet not shown in the drawing, whereby the shafts 3 and 3' fixed thereon are borne by means of bearings not shown in the drawing in such a manner that the moving coil which is supplied with current from the power source is excited and rotated in a certain determined range in the magnetic field of the above-mentioned stator so that the shutter blades are driven by means of the output shaft 3' and the corresponding connecting members so as to carry out the opening and closing operation.

2a and 2b are the slide pieces consisting of metal material with superior conductivity, fixed around the rotary axis and well insulated from each other, and respectively connected to the wires of the above-mentioned coil 4.

1a and 1b are the rod-shaped brushes consisting of metal materials with superior conductivity and elasticity and having a circular section, fixedly arranged so as to be in elastic contact with the above-mentioned slide pieces 2a and 2b and connected to both terminals of the power sources through switch means.

Figure 3:
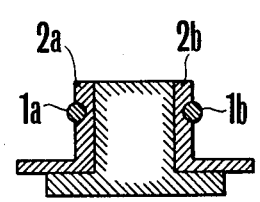
FIG. 3 shows the current supply device of the embodiment shown in FIG. 2 in section.
Figure 4:
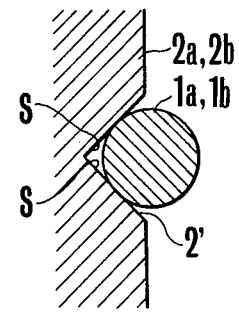
FIG. 4 is the partial view of the embodiment of FIG. 3.

The slide pieces 2a are provided with V-grooves 2' on the circumference as is shown in FIGS. 3 and 4, whereby the current supply brushes 1a and 1b are elastically pushed against the two inclined surfaces S, S so as to be in contact with the slide pieces at two points.

Figure 5:
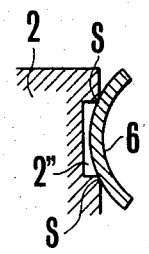
FIG. 5 shows a further embodiment in section.

FIG. 5 shows further another embodiment, whereby the slide piece 2 is provided with a C-shaped groove 2'' on the circumference, with which the current supply brush 6 consisting of a metal plate with a circular section is in contact. The inclined surfaces are provided at the shoulder portions of the groove 2'' in such a manner that the brush 6 is in contact with the two inclined surfaces. As is clear from the above-mentioned embodiment, in case of the present embodiment the slide piece is provided with grooves having two inclined surfaces opposed to each other, against which surfaces the current supply brushes having a circular or a semi-circular section are pressed in such a manner that the current supply brushes are in contact with the slide piece at two points so as to provide a reliable current supply.

Figure 6:
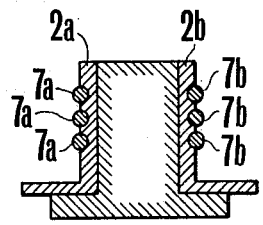
FIG. 6 shows another embodiment in section.

In case of the current supply portion shown in FIG. 6, in order to make the contact between the current supply brushes and the slide pieces more secure, a plural number of the current supply brushes 7a and 7b are provided, and on the circumference of the slide pieces a plural number of V-grooves are also provided. In a case where, a plural number of the current supply brushes are provided, as is shown in FIG. 1, the number of the current supply brushes can be reduced down to the half as compared with a conventional device. Namely, in accordance with the present invention, the number of the current supply brushes can be reduced, while reliable current supply is ensured, thereby reducing the manufacturing cost of the current supply device, whereby the reliability of the shutter is increased.

While specific embodiments of the invention have been shown and described in detail to illustrate the application of the inventive principles, it will be understood that the invention may be embodied otherwise without departing from such principles.

What is claimed is:

1. A current supply device for a moving coil of an electromagnetically driven shutter mechanism for a camera, said moving coil operating in cooperative relationship with a magnetic field generated by the permanent magnet of a stator of said shutter mechanism to be rotatively driven upon being supplied with exciting current from a power source through said current supply device in order to drive a shutter blade assembly of said shutter mechanism, said moving coil having a first shaft fixed to one side thereof for transmitting rotation of said coil to said shutter blade assembly, said current supply device comprising: a second shaft fixed to a side of said coil opposite said one side; a pair of slide pieces each affixed to the outer circumference of said second shaft and having insulating material inserted therebetween each connected to the end of said coil; said slide pieces being formed in a semicylindrical configuration and made of highly conductive material having on the outer circumference thereof a groove defining two opposed inclined surfaces; two current supply brushes resiliently contacting each of said slide pieces, respectively, to supply current from a power source to said moving coil in order to rotatively drive said moving coil; said brushes having an arcuate configuration operating to maintain each of said current supply brushes in direct contact with each of said two inclined surfaces of said groove.

* * * * *